(12) United States Patent
Ash et al.

(10) Patent No.: US 8,438,332 B2
(45) Date of Patent: May 7, 2013

(54) APPARATUS AND METHOD TO MAINTAIN WRITE OPERATION ATOMICITY WHERE A DATA TRANSFER OPERATION CROSSES A DATA STORAGE MEDIUM TRACK BOUNDARY

(75) Inventors: Kevin John Ash, Tucson, AZ (US); Jeffrey Michael Barnes, Tucson, AZ (US); Michael Thomas Benhase, Tucson, AZ (US); Shachar Fienblit, Haifa (IL); Matthew Joseph Kalos, Tucson, AZ (US); Steven Edward Klein, Tucson, AZ (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/489,354

(22) Filed: Jun. 22, 2009

(65) Prior Publication Data

US 2010/0325376 A1    Dec. 23, 2010

(51) Int. Cl.
*G06F 12/00* (2006.01)
(52) U.S. Cl.
USPC .......................................... 711/112; 711/113
(58) Field of Classification Search .................... 711/112
See application file for complete search history.

(56) References Cited

U.S. PATENT DOCUMENTS

| 6,842,834 B2 | 1/2005 | Crockett et al. |
| 7,065,623 B2* | 6/2006 | Chen et al. ..................... 711/169 |
| 7,254,752 B1 | 8/2007 | Don et al. |
| 7,743,210 B1* | 6/2010 | Jernigan et al. ............... 711/114 |
| 2005/0102553 A1 | 5/2005 | Cochran et al. |
| 2005/0198446 A1 | 9/2005 | Ash et al. |
| 2005/0198638 A1* | 9/2005 | Bai et al. ....................... 718/100 |
| 2005/0240564 A1* | 10/2005 | Mashayekhi et al. ............. 707/1 |
| 2006/0106891 A1* | 5/2006 | Mahar et al. .................. 707/203 |
| 2007/0198793 A1 | 8/2007 | Jafri et al. |

* cited by examiner

*Primary Examiner* — Tuan Thai
*Assistant Examiner* — Ngoc Dinh
(74) *Attorney, Agent, or Firm* — Dale F. Regelman; Quarles & Brady LLP

(57) ABSTRACT

A method to maintain write operation atomicity where a write operation crosses a data storage medium track boundary. The method supplies a storage controller comprising a host adapter, a processor, and a NVS. The host adapter receives from a host computer a write request and data. The method determines if the write request will cross a data storage medium track boundary. If the write request will cross a data storage medium track boundary, the method indicates to the host adapter that the write request comprises a two-track transfer, and writes the data to the NVS as the data is received. If the host computer fails prior to providing all the data to the storage controller, the method discards the data written to the NVS to ensure write operation atomicity.

16 Claims, 8 Drawing Sheets

US 8,438,332 B2

APPARATUS AND METHOD TO MAINTAIN WRITE OPERATION ATOMICITY WHERE A DATA TRANSFER OPERATION CROSSES A DATA STORAGE MEDIUM TRACK BOUNDARY

FIELD OF THE INVENTION

The invention relates to an apparatus and method to maintain write operation atomicity where a data transfer operation crosses a data storage medium track boundary.

BACKGROUND OF THE INVENTION

Database software often writes data in units called pages. In certain embodiments, the size of such a page may be chosen by a user. Using DB2 for example, page sizes range from 4 kilobytes to 32 kilobytes. Generally, the larger the page size, the better the performance of the database program.

When storing database files, or copying database files in a PPRC operation, the write of a page can fail at any point in the write operation due to, among other things, a server failure, server power failure, network failure, switch failure, storage device failure, and the like. As a general matter, storage operations will maintain the atomicity of a write operation if the write data is contained within a single "track." However, if a write or copy operation crosses a data storage medium track boundary, there is no guarantee that atomicity of the write will be maintained, i.e. a portion of a database page may be received and stored and another portion of that same database page may be lost.

SUMMARY OF THE INVENTION

Applicants' invention comprises a method to maintain write operation atomicity where a write operation crosses a data storage medium track boundary. The method supplies a storage controller comprising a host adapter and non-volatile storage ("NVS") The host adapter receives from a host computer a write request and data.

The method determines if the write request will cross a data storage medium track boundary. If the write request will cross a data storage medium track boundary, the method indicates to the host adapter that the write request comprises a two-track transfer, and writes the data to two tracks in a NVS track buffer as the data is received.

If the host computer fails prior to providing all the data to the storage controller, the method discards the data written to the NVS to ensure write operation atomicity. The method then transfers both tracks from the NVS track buffer to different NVS segments. If both tracks are not successfully transferred, the data written to the NVS is discarded.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 6:
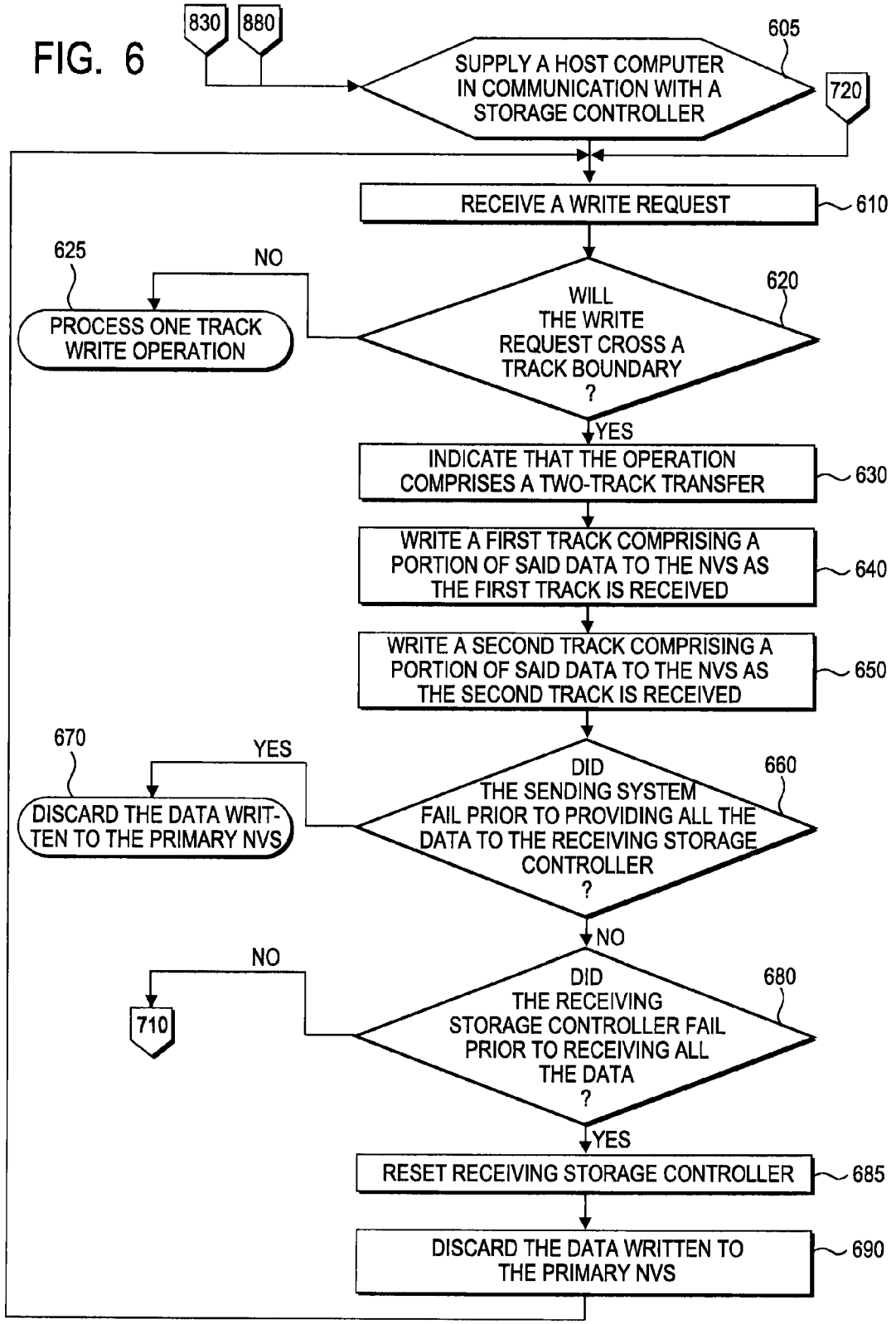
FIG. 6 is a flow chart summarizing certain initial steps in Applicants' method to assure write operation atomicity in data transfer operations.
Figure 7:
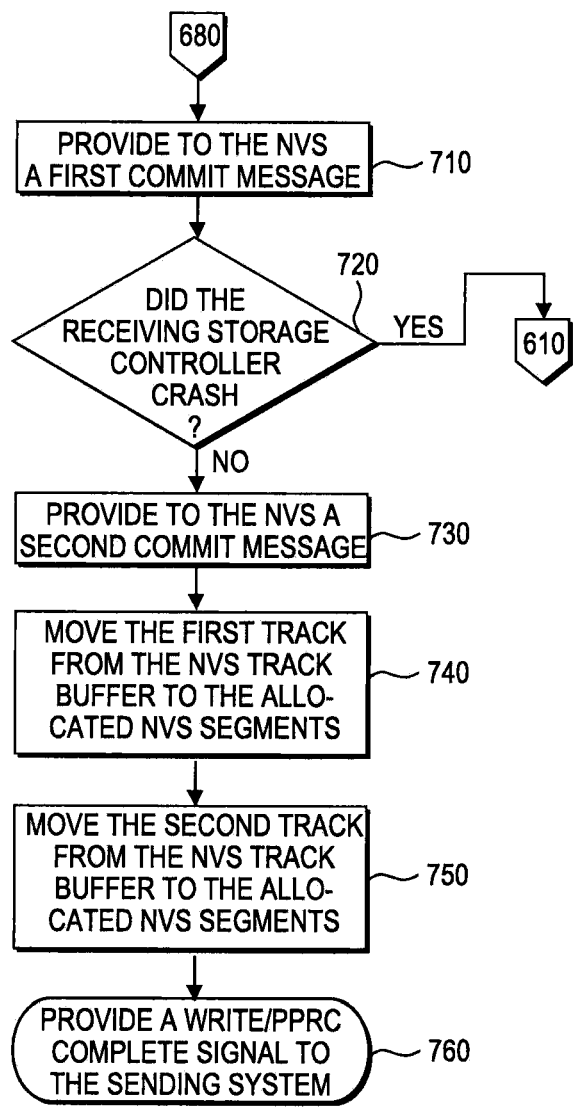
FIG. 7 is a flow chart summarizing certain additional steps in Applicants' method to assure write operation atomicity in data transfer operations.
Figure 8:
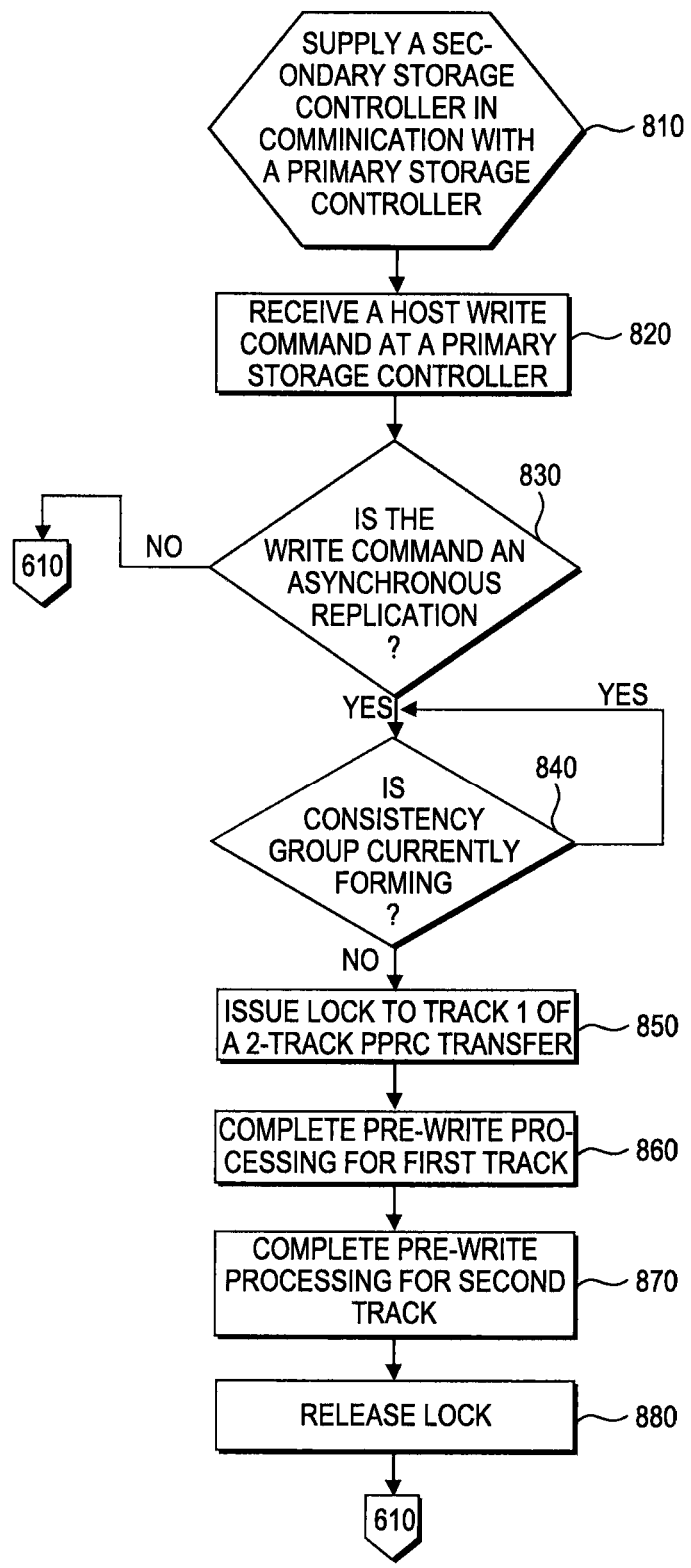
FIG. 8 is a flow chart summarizing certain initial steps in Applicants' method to assure write operation atomicity in PPRC operations.

The schematic flow chart diagram included are generally set forth as logical flow-chart diagrams (e.g., FIGS. 6, 7, 8). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 6, 7, 8). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
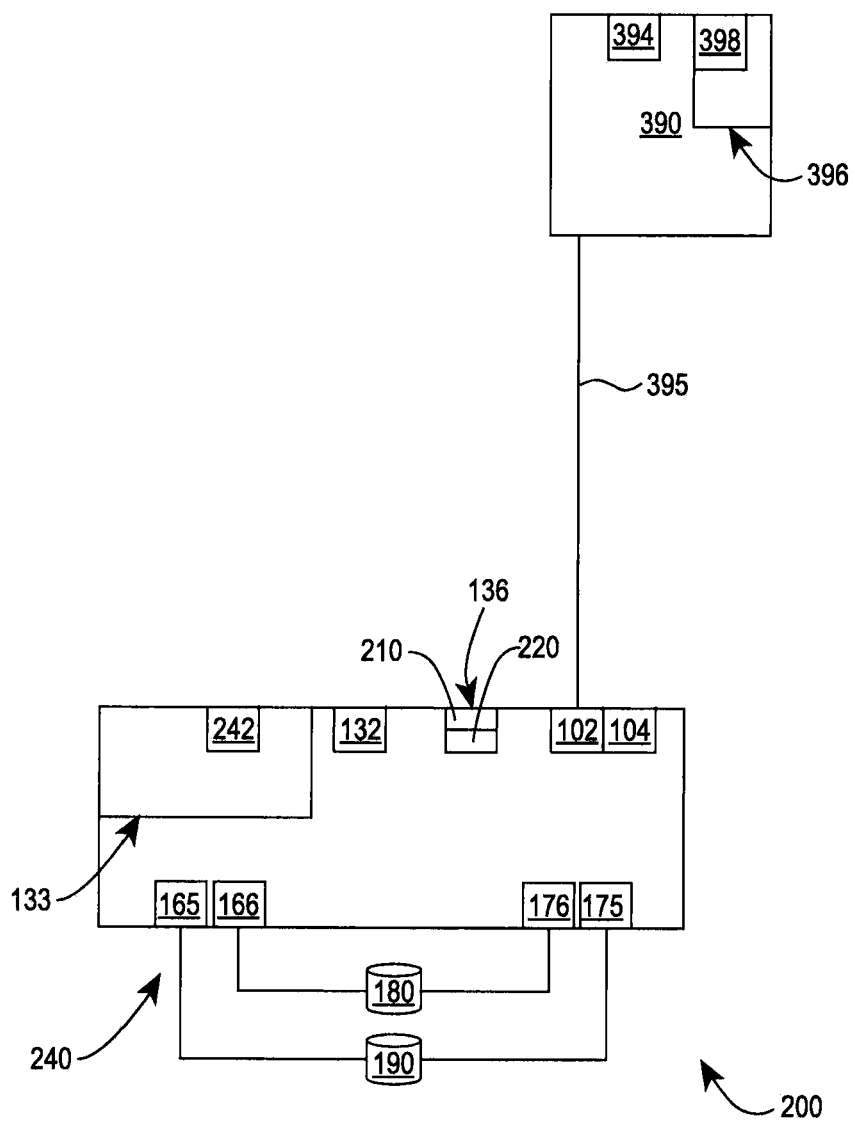
FIG. 2 is a block diagram showing a host computer in communication with a storage controller.

Referring to FIG. 2, data storage system 200 includes storage controller 240 which interconnects a plurality of data storage drives 180 and/or a plurality of data storage drives 190, with a computing device 390. Storage controller 240 comprises a processor 132 and memory 133, and instructions 242 written to memory 133. Storage controller further comprises non-volatile storage ("NVS") 136. In certain embodiments, NVS 136 comprises a track buffer portion 210 and a segments portion 220.

In certain embodiments, storage controller 240 communicates with the plurality of data storage devices 190 via device adapters 165 and 175, and with plurality of data storage devices 180 via device adapters 166 and 176, using an I/O protocol selected from the group consisting of SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

Figure 3:
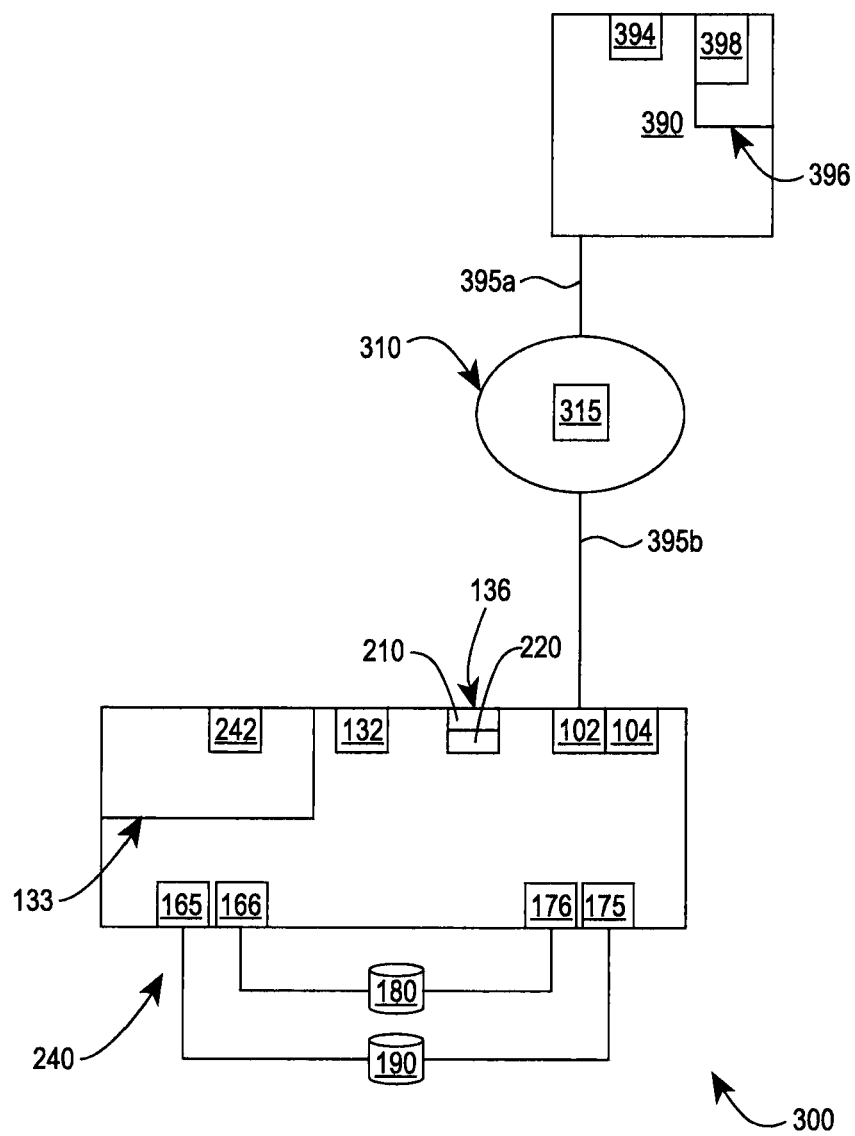
FIG. 3 is a block diagram showing a host computer and a storage controller communicating with one another via a fabric.

In the illustrated embodiments of FIGS. 2, and 3, host computer 390 comprises a processor 394 and computer readable medium 396, wherein instructions 398 are encoded in computer readable medium 396. In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiment of FIG. 3, host computer 390 and storage controller 240 communicate with one another via fabric 310. In certain embodiments, fabric 310 includes, for example, one or more FC switches 315. In certain embodiments, those one or more switches 315 include one or more conventional router switches. In the illustrated embodiment of FIG. 3, one or more switches 315 interconnect host computer 390 to storage controller 240 via communication paths 395a and 395b using any type of I/O interface, for example, a Fibre Channel ("FC"), Infiniband, Gigabit Ethernet, Ethernet, TCP/IP, iSCSI, SCSI I/O interface, or one or more signal lines used by FC switch 315 to transfer information through, to, and from storage controller 240, and subsequently the plurality of data storage devices 180 and/or 190.

In the illustrated embodiments of FIGS. 2 and 3, host computer 390 is interconnected to host adapter 102 disposed in storage controller 240 via communication link 395. The illustrated embodiment of FIG. 2 shows host computer 390 interconnected with storage controller 240 via one communication link. The illustrated embodiment of FIG. 3 shows host computer 390 interconnected with fabric 310 via one communication link. In other embodiments, host computer 390 is interconnected with storage controller 240/fabric 310 with more than one communication link. In certain embodiments, communication link 395 may be configured to comprise a plurality of logical communication paths.

Figure 1:
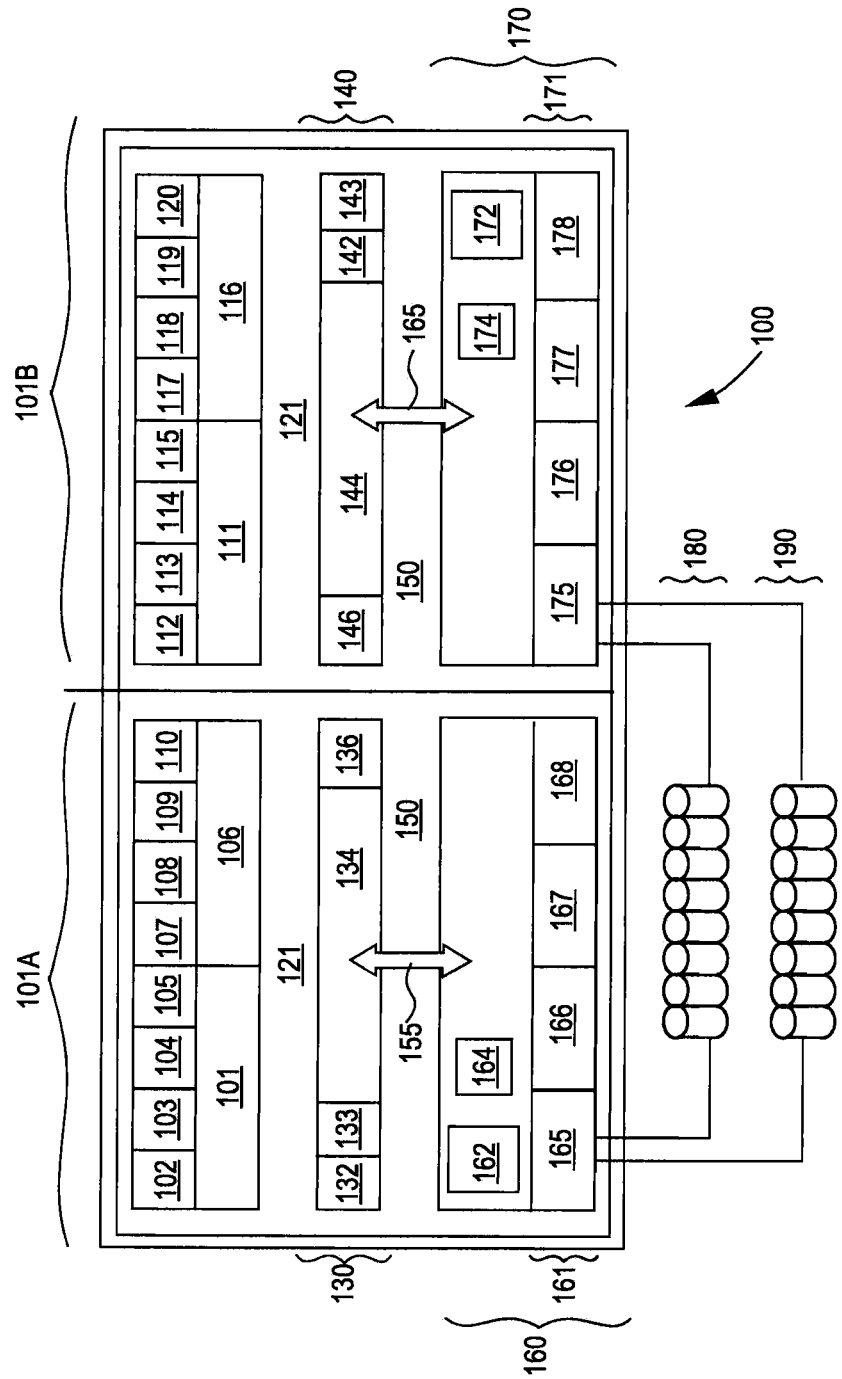
FIG. 1 is a block diagram showing the elements of a host computer.

Referring now to FIG. 1, in certain embodiments, Applicants' data storage controller comprises data storage controller 100. In certain implementations, data storage controller 100 includes a first cluster 101A and a second cluster 101B, wherein clusters 101A and 101B are disposed in the same housing. In the illustrated implementation of FIG. 1, data storage controller 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may comprise any kind of I/O interface. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage controller 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 143, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen data storage devices are organized into two arrays. In other embodiments, the data storage system includes more than two storage device arrays. In certain embodiments, each storage array appears to a host computer as one or more logical devices.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

As those skilled in the art will appreciate, Peer to Peer Remote Copy or PPRC is a protocol to copy data from a primary storage controller to secondary storage controller disposed at a remote site. Using a synchronous PPRC, the I/O is only considered complete when writes to both primary and secondary storage controllers have completed. Asynchronous PPRC will flag tracks on the primary storage controller to be duplicated to the secondary storage controller at a later time.

Figure 4:
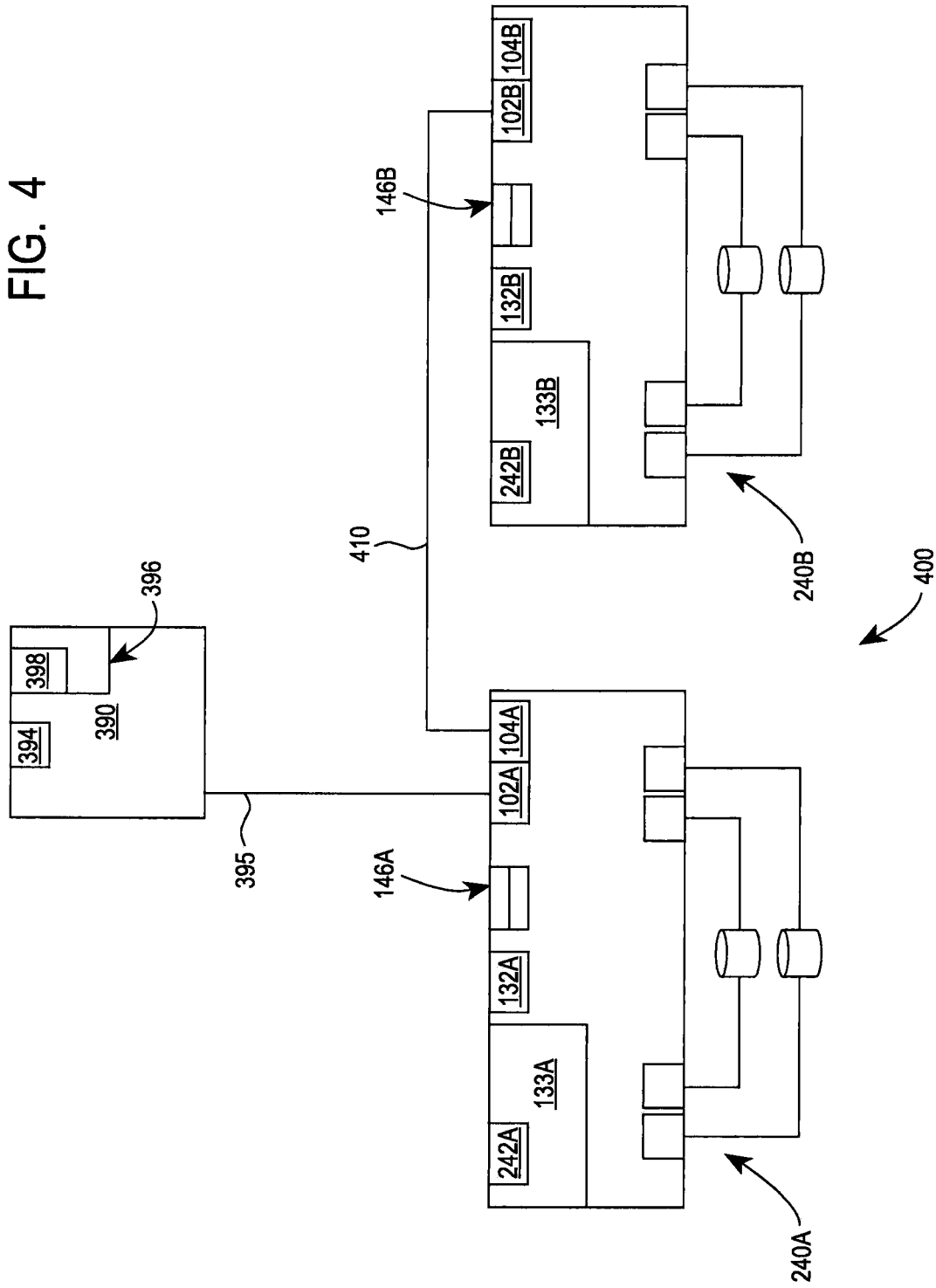
FIG. 4 illustrates a primary storage controller in communication with a secondary storage controller for PPRC operations.
Figure 5:
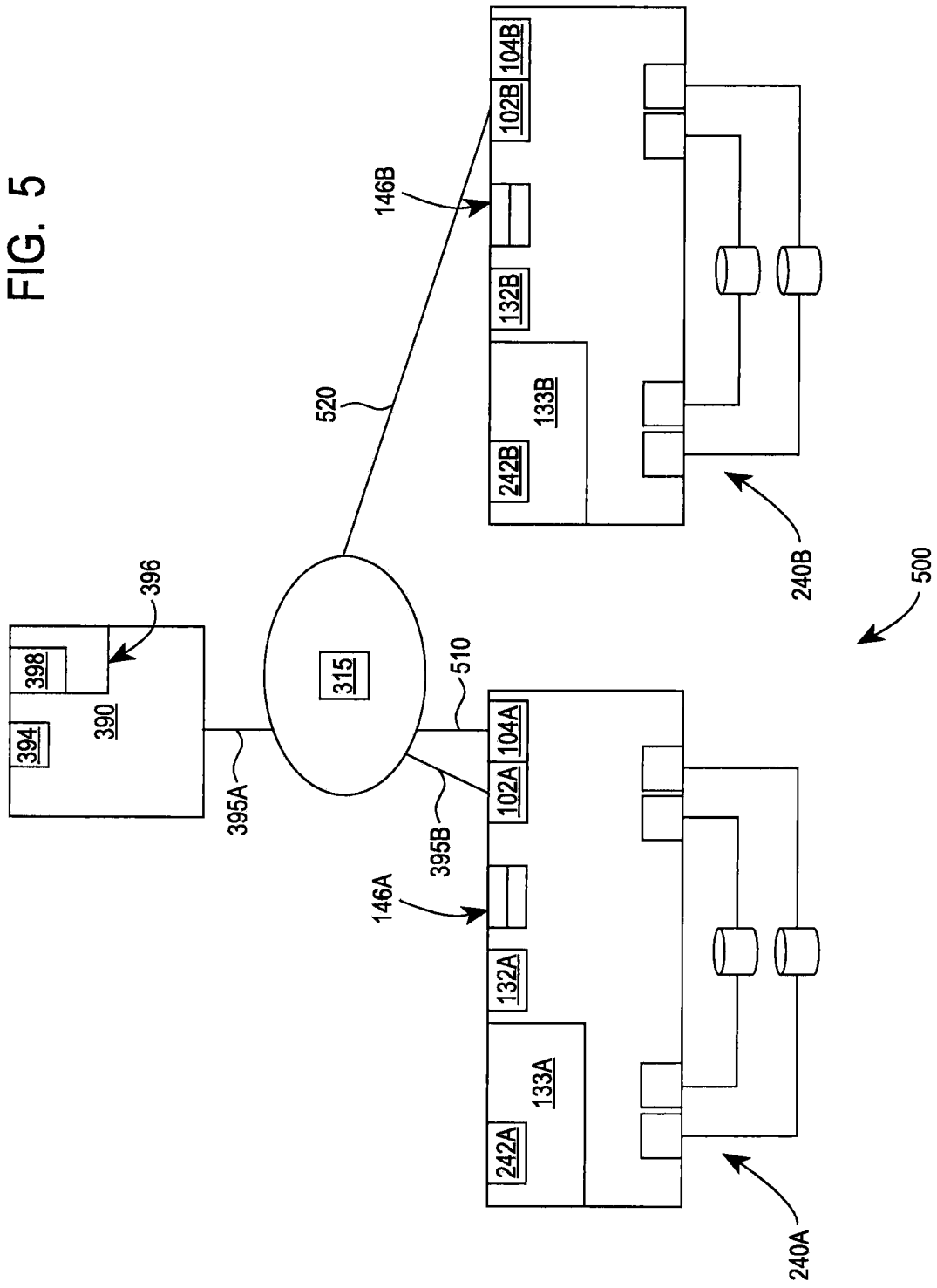
FIG. 5 illustrates a primary storage controller and a secondary storage controller in communication via a fabric for PPRC operations.

FIG. 4 shows peer to peer copy ("PPRC") system 400 which comprises a primary storage controller 240A in communication with a host computer 390 using communication link 395, wherein that primary storage controller 240A is also in communication with a secondary storage controller 240B via communication link 410. FIG. 5 shows peer to peer copy ("PPRC") system 500 which comprises a primary storage controller 240A in communication with a host computer 390 using fabric 315 and communication links 395*a* and 395*b*, wherein that primary storage controller 240A is also in communication with a secondary storage controller 240B using fabric 315 and communication links 510 and 520.

Database software often writes tablespace data in units called pages. In certain embodiments, the size of such a page may be chosen by a user. Using DB2 for example, page sizes range from 4 kilobytes to 32 kilobytes. Generally, the larger the page size, the better the performance of the database program.

When storing database files, or copying database files in a PPRC operation, the write of a page can fail at any point in the write operation due to, among other things, a server failure, server power failure, network failure, switch failure, storage device failure, and the like. Storage operations may maintain the atomicity of a write operation if the write data is contained within a single "track." However, storage operations that maintain single track atomicity may not maintain the atomicity if a write/copy operation crosses a data storage medium track boundary. Applicants' invention comprises a method to maintain write operation atomicity in both host computer to storage controller transfers, and also for both synchronous and asynchronous PPRC operations comprising storage controller to storage controller transfers.

FIG. 6 summarizes the initial steps of Applicants' host computer to storage controller data transfer operation. Steps 605, 610, 620, and 625, are specific to a write operation wherein data received from a host computer is written to storage in a storage controller. In certain embodiments, steps 630 through 690, and 710 through 760, are utilized in a data transfer operation wherein data generated by a host computer is written to storage in a storage controller. In certain embodiments, steps 630 through 690, and 710 through 760, are utilized in a PPRC data transfer from a primary storage controller to a secondary storage controller.

Referring now to FIG. 6, in step 605 the method supplies a host computer in communication with a storage controller, such as for example host computer 390 and storage controller 240 or storage controller 100.

In step 610, the method generates and provides a write request. In certain embodiments, the write request of step 610 is generated by a host computer. In certain embodiments, the write request is received by a storage controller, such as storage controller 240 (FIGS. 2, 3, 4, 5) or storage controller 100 (FIG. 1). In certain embodiments, the write request of step 610 is received by a host adapter, such as host adapter 102 (FIGS. 1, 2, 3, 4, 5).

In step 620, the method determines if the write request will cross a data storage medium track boundary. In certain embodiments, step 620 is performed by a processor, such as for example processor 132, disposed in the storage controller of step 605.

If the method determines in step 620 that the write request of step 610 will not cross a track boundary, then the method transitions from step 620 to step 625 wherein the method processes a one track write operation. Alternatively, if the method determines in step 620 that the write request of step 610 will cross a track boundary, then the method transitions from step 620 to step 630 wherein the method indicates that the operation comprises a two-track transfer. In certain embodiments, step 630 is performed by a processor disposed in a receiving storage controller. In certain embodiments, step 630 comprises signaling a receiving host adapter in the receiving storage controller that the operation comprises a two-track transfer.

In step 640, the method writes a first track comprising a portion of the data comprising the write request of step 610 to a NVS, such as for example NVS 136 (FIGS. 1, 2, 3). In certain embodiments, step 640 comprises writing a first data track to a first track of a NVS track buffer, such as NVS track buffer 210 (FIGS. 2, 3). In certain embodiments, step 640 is performed by a processor disposed in a receiving storage controller.

In certain embodiments, the storage controller comprises two clusters, such as for example cluster 101A (FIG. 1) and cluster 101B (FIG. 1). In these embodiments, a first data track received by a host adapter, such as host adapter 102, disposed in cluster 101A is written to a first track of a NVS buffer 146 disposed in cluster 101B.

In step 650, the method writes a second track comprising a portion of the data comprising the write request of step 610 to a NVS, such as for example NVS 136 (FIGS. 1, 2, 3). In certain embodiments, step 650 comprises writing a second data track to a second track of a NVS track buffer, such as NVS track buffer 210 (FIGS. 2, 3). In certain embodiments, step 650 is performed by a processor disposed in a receiving storage controller.

In certain embodiments, the storage controller comprises two clusters, such as for example cluster 101A (FIG. 1) and cluster 101B (FIG. 1). In these embodiments, a second data track received by a host adapter, such as host adapter 102, disposed in cluster 101A is written to a first track of a NVS buffer 146 disposed in cluster 101B.

In step 660, the method determines if the sending system, such as host computer in a write operation or a primary storage controller in a PPRC operation, failed to provide all the data to the receiving storage controller. Such a failure to provide all the data can arise from a host computer failure, a primary storage controller failure in a PPRC operation, a network failure, a switch failure, and the like. In certain embodiments, step 660 is performed by a processor disposed in a receiving storage controller.

If the method determines in step 660 that the sending system failed to provide all the data to the receiving storage controller, then the method transitions from step 660 to step 670 wherein the method discards the data written to a NVS in steps 640 and/or 650. In certain embodiments, step 670 is performed by a processor disposed in a receiving storage controller.

Alternatively, if the method determines in step 660 that the sending system successfully provided all the data to the receiving storage controller, then the method transitions from step 660 to step 680 wherein the method determines if the receiving storage controller failed prior to receiving all the data provided in the write request of step 610. In certain embodiments, step 680 is performed by a host computer in a write operation or a primary storage controller in a PPRC operation.

If the method determines in step 680 that the receiving storage controller failed prior to receiving all the data provided in the write request of step 610, then the method transitions from step 680 to step 685 wherein the method resets the receiving storage controller. In step 690, the method discards the NVS data received. In certain embodiments, step 670 is performed by a processor disposed in the reset storage controller. The method transitions from step 690 to step 610 and proceeds as described herein.

Alternatively, if the method determines in step 680 that the receiving storage controller did not fail prior to receiving all the data provided in the write request of step 610, then the method transitions from step 680 to step 710 wherein the method provides the NVS of step 640 (FIG. 6) a first commit message. In certain embodiments, step 710 is performed by a host adapter receiving data from a host computer in a write operation or from a primary storage controller in a PPRC operation.

In step 720, the method determines if the receiving storage controller failed after issuing the first commit message of step 710. In certain embodiments, step 720 is performed by a host computer in a write operation or a primary storage controller in a PPRC operation. If the method determines in step 720 that the receiving storage controller failed after issuing the first commit message of step 710, then the method transitions from step 720 to step 610 and proceeds as described herein.

Alternatively, if the method determines in step 720 that the receiving storage controller did not fail after issuing the first commit message of step 710, then the method transitions from step 720 to step 730 wherein the method provides to the NVS of step 650 (FIG. 6) a second commit message. In certain embodiments, step 730 is performed by a host adapter receiving data from a host computer in a write operation or from a primary storage controller in a PPRC operation.

In step 740, the method moves the first data track of step 640 from a NVS track buffer, such as NVS track buffer 210 (FIGS. 2, 3) to NVS segments, such as NVS segments 220 (FIGS. 2, 3). In certain embodiments, step 740 is performed by a processor disposed in a receiving storage controller.

In step 750, the method moves the second data track of step 650 from a NVS track buffer, such as NVS track buffer 210 (FIGS. 2, 3) to NVS segments, such as NVS segments 220 (FIGS. 2, 3). In certain embodiments, step 750 is performed by a processor disposed in a receiving storage controller.

In step 760, the method provides a write complete signal. In certain embodiments, step 760 comprises providing a write complete signal to a sending host computer in a write operation. In certain embodiments, step 760 comprises providing a write complete signal to a sending primary storage controller in a PPRC operation.

FIG. 8 summarizes the initial steps of Applicants' method to maintain copy operation atomicity in both synchronous and asynchronous peer-to-peer copy ("PPRC") operations comprising storage controller to storage controller transfers. Referring now to FIG. 8, in step 810 the method supplies a secondary storage controller, such as for example storage controller 240B (FIGS. 4, 5), in communication with a primary storage controller, such as storage controller 240A (FIGS. 4, 5).

In step 820, the method generates and provides a host write command which is received at a primary storage controller. In certain embodiments, the write command of step 820 is received by a host adapter, such as host adapter 102A (FIGS. 4, 5) or 102B (FIGS. 4, 5).

In step 830, the method determines if the write command of step 820 comprises an asynchronous replication. In certain embodiments, step 830 is performed by a processor, such as for example processor 132A, disposed in a primary storage controller.

If the method determines in step 830 that the PPRC write command of step 820 comprises an asynchronous replication, then the method transitions from step 830 to step 610. If the write command comprises a synchronous replication than both a primary storage controller and a secondary storage controller individually and independently implement steps 620 through 690, and 710 through 760.

Alternatively, if the method determines in step 830 that the write command of step 820 comprises an asynchronous replication, then the method transitions from step 830 to step 840. In certain embodiments, step 840 is performed by a processor disposed in a primary storage controller. In an asynchronous replication, steps 840, 850, 860, 870, and 880, are performed by the primary storage controller.

In step 840, the method determines if a consistency group is currently being formed. In certain embodiments, step 840 is performed by a processor disposed in a primary storage controller.

If the method determines in step 840 that a consistency group is currently being formed, then the method waits until consistency group formation is completed. If the method determines in step 840 that a consistency group is not being formed, i.e. consistency group formation is complete, then the method transitions from step 840 to step 850 wherein the method issues a lock to a first track of a two track write operation. While that lock is in place, the method cannot transition from a consistency group forming status to a normal status, or vice versa. In certain embodiments, step 850 is performed by a processor disposed in a primary storage controller.

In step 860, the method completes pre-write processing for a first track of a data set. In certain embodiments, step 860 is performed by a processor disposed in a primary storage controller.

In step 870, the method completes pre-write processing for a second track of a data set, wherein that second track comprises the remainder of the dataset that crosses a track boundary. In certain embodiments, step 870 is performed by a processor disposed in a primary storage controller. In certain embodiments, step 870 is performed by a host computer in communication with a primary storage controller.

In step 880, the method releases the lock of step 850. In certain embodiments, step 880 is performed by a processor disposed in a primary storage controller. In certain embodiments, step 880 is performed by a host computer in communication with a primary storage controller. The method transitions from step 880 to step 610 wherein a secondary storage controller implements steps 620 through 690, and steps 710 through 760.

In certain embodiments, individual steps recited in FIGS. 6, 7, and 8, may be combined, eliminated, or reordered.

In certain embodiments, instructions, such as instructions 242 (FIGS. 2, 3) encoded in computer readable medium 133 (FIGS. 1, 2, 3), and/or instructions 398 encoded in computer readable medium 396, wherein those instructions are executed by a processor, such as processor 132 (FIGS. 1, 2, 3), and/or 142 (FIG. 1), and/or 394 (FIGS. 2, 3), to perform one or more of steps 610, 620, 625, 630, 640, 650, 660, 670, 680, 690, recited in FIG. 6, and/or one or more of steps 710, 720, 730, 740, 750, and/or 760, recited in FIG. 7, and/or one or more of steps 810, 820, 825, 830, 840, 850, 852, 854, 860, 870, and/or 880, recited in FIG. 8.

In other embodiments, the invention includes instructions residing in any other computer program product, where those instructions are executed by a computer external to, or internal to, data storage controller 100 (FIG. 3), data storage system 200 (FIG. 1), data storage system 300 (FIG. 2), PPRC system 400 (FIG. 4), or PPRC system 500 (FIG. 5), to perform one or more of steps 610, 620, 625, 630, 640, 650, 660, 670, 680, 690, recited in FIG. 6, and/or one or more of steps 710, 720, 730, 740, 750, and/or 760, recited in FIG. 7, and/or one or more of steps 810, 820, 825, 830, 840, 850, 852, 854, 860, 870, and/or 880, recited in FIG. 8. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to maintain write operation atomicity if a data transfer operation crosses a data storage medium track boundary, comprising:
supplying a primary storage controller comprising two clusters wherein each cluster comprises a host adapter, a processor, and a NVS;
receiving by a first cluster host adapter from a host computer a write request and data;
determining by a first cluster processor if said write request will cross a data storage medium track boundary;
operative if said write request will cross a data storage medium track boundary:
indicating by said first cluster processor to said first cluster host adapter that said write request comprises a two-track transfer;
writing a first track comprising a portion of said data to said first cluster NVS as the data is received;
writing a second track comprising a portion of said data to a second cluster NVS as the data is received;
operative if said host computer fails prior to providing all the data to said primary storage controller, discarding said data written to said first cluster NVS and said second cluster NVS.

2. The method of claim 1, wherein said first cluster NVS comprises a first cluster NVS track buffer and first cluster NVS segments, further comprising writing said first track to said first cluster NVS track buffer.

3. The method of claim 2, further comprising allocating first cluster NVS segments to said write request.

4. The method of claim 3, further comprising:
determining that all of said data has been written to said first cluster or second cluster NVS track buffer;
providing a first commit message;
providing a second commit message;
moving said first track from said first cluster NVS track buffer to allocated NVS segments; and
moving said second track from said second cluster NVS track buffer to allocated NVS segments.

5. The method of claim 4, wherein said first cluster host adapter performs said determining step and said providing steps.

6. The method of claim 4, further comprising the step of providing a write complete signal to said host computer.

7. The method of claim 1, further comprising:
supplying a secondary storage controller comprising a secondary host adapter, a secondary processor, and a secondary NVS, wherein said secondary NVS comprises a secondary NVS track buffer and secondary NVS segments;
receiving by said first cluster host adapter from a host computer a write copy command to receive data from said host computer, store said data in said storage controller, and synchronously transfer said data to said secondary storage controller;
synchronously providing said first track from said first cluster host adapter to said secondary host adapter;
writing said first track to said secondary NVS track buffer;
synchronously providing said second track from said first host adapter to said secondary host adapter;
writing said second track to said secondary NVS track buffer;
operative if said host computer or said storage controller or said secondary storage controller fails prior to receiving all the data by said secondary storage controller, discarding the data written to said secondary NVS.

8. The method of claim 7, further comprising:
determining that all of said data has been received by said second storage controller;
providing to said secondary NVS a third commit message;
providing to said secondary NVS a fourth commit message;
moving said first track from a secondary NVS track buffer to said secondary NVS segments; and
moving said second track from said secondary NVS track buffer to said secondary NVS segments.

9. The method of claim 8, further comprising:
operative if said secondary storage server fails after providing said third commit message but before providing said fourth commit message, giving failed status to said write request.

10. The method of claim 1, further comprising:
receiving by said first cluster host adapter from a host computer a write command to receive data from said host computer, store said data in said primary storage controller, and asynchronously transfer said data to said secondary storage controller;
forming a consistency group;
issuing a lock;
completing pre-write processing for said first track;
completing pre-write processing for said second track;
releasing said lock.

11. An article of manufacture comprising two clusters wherein each cluster comprises a host adapter, a processor, and a NVS, and a computer readable medium comprising computer readable program code disposed therein to maintain write operation atomicity where a data transfer operation crosses a data storage medium track boundary, the computer readable program code comprising a series of computer readable program steps to effect:
receiving by a first cluster host adapter from a host computer a write request and data;
determining by a first cluster processor if said write request will cross a data storage medium track boundary;
operative if said write request will cross a data storage medium track boundary:
indicating by said first cluster processor to said first cluster host adapter that said write request comprises a two-track transfer;
writing a first track comprising a portion of said data to said first cluster NVS as the data is received;
writing a second track comprising a portion of said data to a second cluster NVS as the data is received;
operative if said host computer fails prior to providing all the data to said primary storage controller, discarding said data written to said first cluster and said second cluster NVS.

12. The article of manufacture of claim 11, wherein said first cluster NVS comprises a first cluster NVS track buffer and first cluster NVS segments, the computer readable program code to write said first track to said first cluster NVS further comprising a series of computer readable program steps to effect writing said first track to said first cluster NVS track buffer.

13. The article of manufacture of claim 12, the computer readable program code further comprising a series of computer readable program steps to effect:
- providing a first commit message;
- providing a second commit message; and
- moving said first track from said first cluster NVS track buffer to allocated first cluster NVS segments.

14. The article of manufacture of claim 13, the computer readable program code further comprising a series of computer readable program steps to effect providing a write complete signal to said host computer.

15. The article of manufacture of claim 11, wherein said article of manufacture is in communication with a secondary storage controller comprising a secondary host adapter, a secondary processor, and a secondary NVS, wherein said secondary NVS comprises a secondary NVS track buffer and secondary NVS segments, the computer readable program code further comprising a series of computer readable program steps to effect:
- receiving a from a host computer a write command to receive data from said host computer, store said data in said article of manufacture, and asynchronously transfer said data to said secondary storage controller;
- forming a consistency group;
- issuing a lock;
- completing pre-write processing for said first track;
- completing pre-write processing for said second track;
- releasing said lock.

16. The article of manufacture of claim 15, the computer readable program code further comprising a series of computer readable program steps to effect signaling said secondary host adapter that said write command crosses a data storage medium track boundary.

* * * * *